(12) United States Patent
Saccomanno et al.

(10) Patent No.: US 6,948,832 B2
(45) Date of Patent: Sep. 27, 2005

(54) LUMINAIRE DEVICE

(75) Inventors: Robert J. Saccomanno, Montville, NJ (US); Ivan B. Steiner, Ridgewood, NJ (US)

(73) Assignee: Honeywell International, Inc., Morristown, NJ (US)

( * ) Notice: Subject to any disclaimer, the term of this patent is extended or adjusted under 35 U.S.C. 154(b) by 34 days.

(21) Appl. No.: 10/366,337

(22) Filed: Feb. 14, 2003

(65) Prior Publication Data

US 2004/0047162 A1 Mar. 11, 2004

Related U.S. Application Data

(60) Provisional application No. 60/409,269, filed on Sep. 10, 2002.

(51) Int. Cl.[7] .................................................. F21V 7/00
(52) U.S. Cl. ....................... 362/347; 362/328; 362/333; 362/346
(58) Field of Search ................................ 362/328, 333, 362/346, 347, 31, 268, 327, 331, 339, 260

(56) References Cited

U.S. PATENT DOCUMENTS 5,676,453 A * 10/1997 Parkyn et al. .............. 362/260
5,676,457 A    10/1997 Simon
5,810,469 A *  9/1998 Weinreich ................... 362/298
5,897,201 A    4/1999 Simon

FOREIGN PATENT DOCUMENTS

DE         43 25 115 A1     4/1995

OTHER PUBLICATIONS

International Search Report.

* cited by examiner

Primary Examiner—John Anthony Ward
(74) Attorney, Agent, or Firm—Pillsbury Winthrop Shaw Pittman LLP

(57) ABSTRACT

A luminaire including a lamp, reflector, collimator and optional waveguide. The waveguide can be solid or hollow or include several serially-arranged total internal reflection (TIR) components for redirecting light that has entered the waveguide. In one embodiment, the TIR components are prisms, but are provided without metallized coatings thereby significantly reducing manufacturing costs. In another embodiment, components are arranged in a vertical orientation such that light is directed downward through a collimator or upward, either directly from the lamp or as a result of reflection from the reflector.

10 Claims, 22 Drawing Sheets

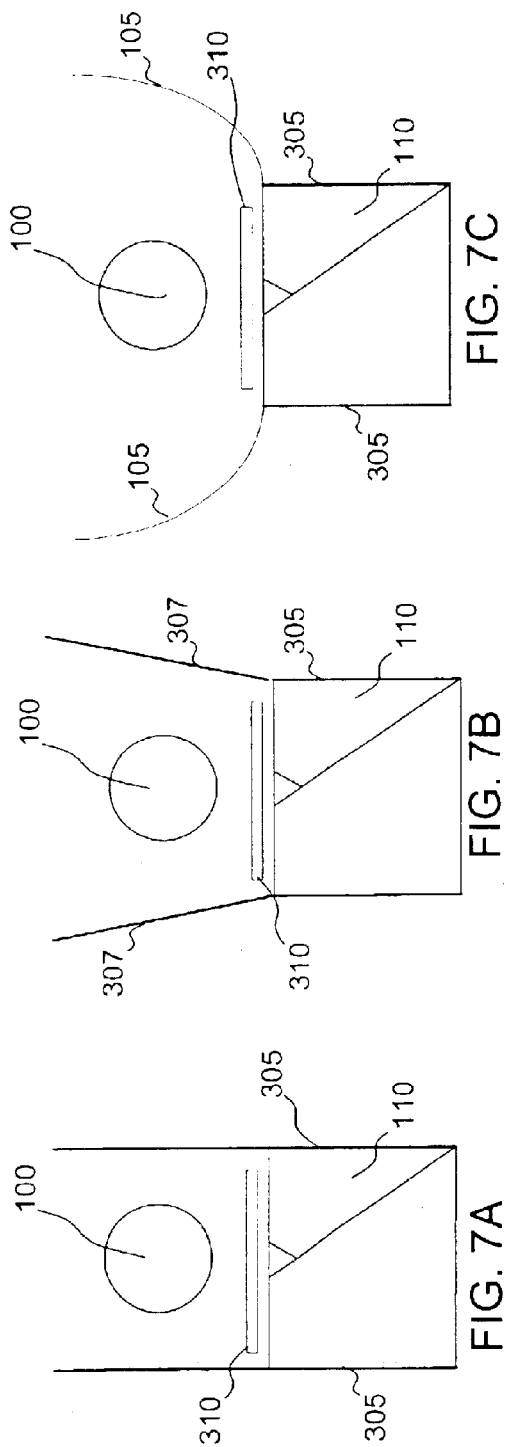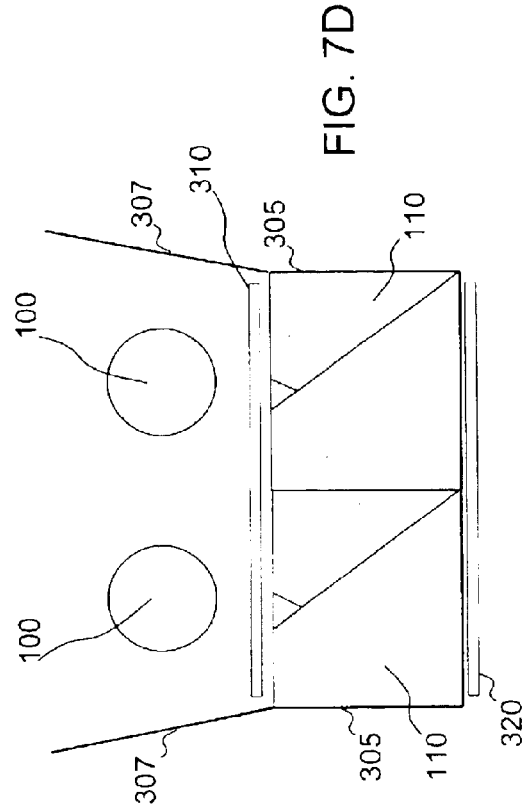

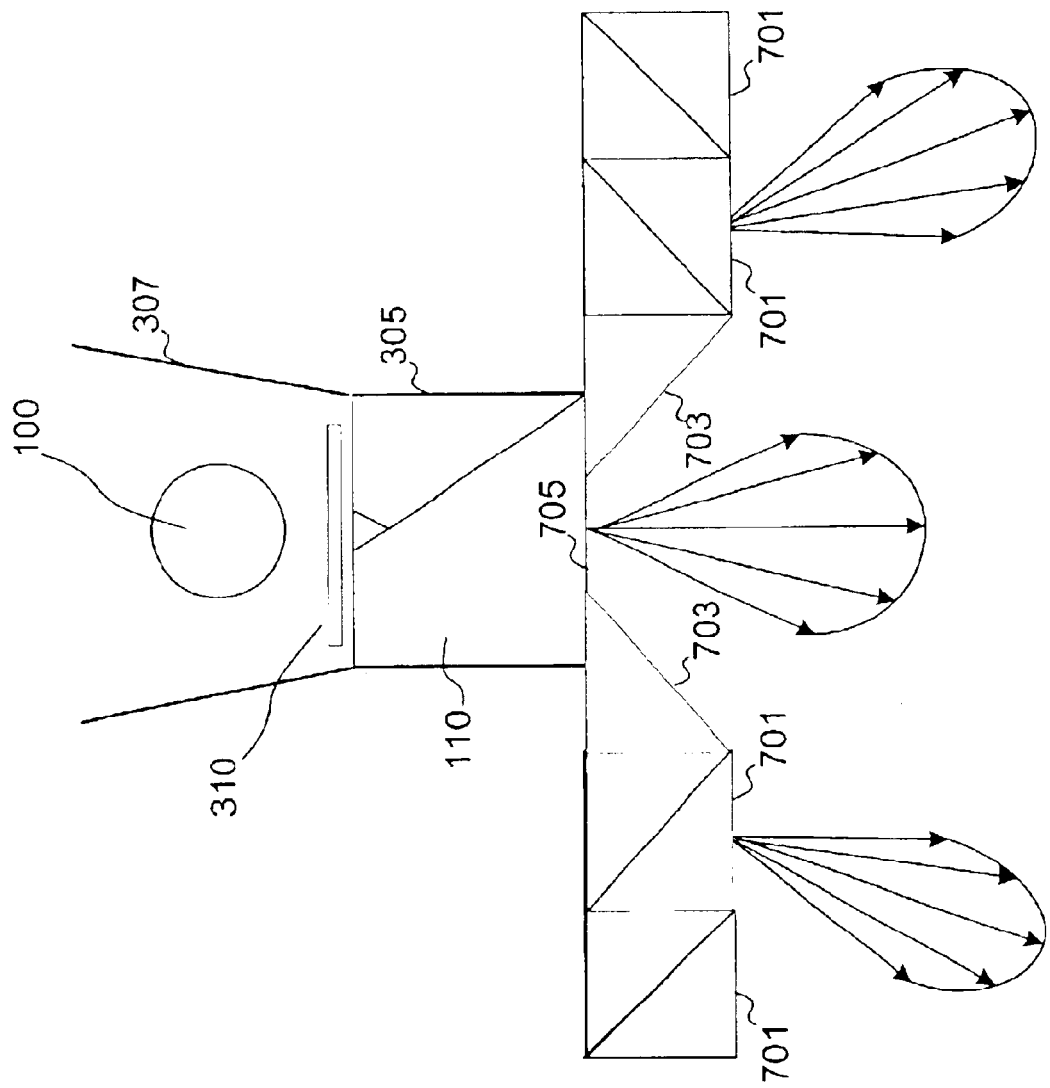

LUMINAIRE DEVICE

This application claims the benefit of U.S. Provisional Application No. 60/409,269, filed Sep. 10, 2002, which is herein incorporated by reference in its entirety.

BACKGROUND

1. Field of the Invention

The present invention is directed to improvements in luminaire devices. More particularly, the present invention is directed to devices and methods for directing light in certain directions and/or restricting light from emanating in certain directions using unique combinations of reflectors, collimators, refractive media, waveguides, and Total Internal Reflection (TIR) components.

2. Background of the Invention

There are ongoing efforts to improve upon existing luminaire devices in view of standards such as ISO 5035/7, which require, among other things, restricting light emanating from a luminaire to between 45 and 85 degrees relative to the ceiling-normal. Light rays limited in such a fashion reduce glare in the vicinity of computer screens, for example, thereby decreasing eyestrain and fatigue on office workers and, as a result, increasing their productivity.

Well-known luminaires include those described by U.S. Pat. Nos. 5,237,641 and 6,335,999, but the luminaire structures described in those patents have complicated structures or have other shortcomings that have yet to be addressed in the art.

SUMMARY OF THE INVENTION

The present invention is directed to improvements to and unique configurations for luminaire devices that provide light that is in compliance with standards such as ISO 5035/7, which require, among other things, that light emanating from a luminaire be restricted within an angular envelope with respect to a ceiling-normal. In a first embodiment of the present invention, a luminaire device includes a lamp such as a tubular florescent bulb that is mounted in a holder and is partially surrounded on an underside thereof by a curved reflector. The reflector may be smooth or multi-faceted. To one side of the lamp is a collimator. Light rays from the lamp are directed directly upward, directly downward towards the curved reflector, and towards the collimator either directly or by reflection from the curved reflector. Generally speaking, most of the light emanating from the lamp is directed upward either directly or by reflection. The remaining light falls on an input side of the collimator, which acts to orient the rays of light falling on the input side of the collimator. Adjacent the output side of the collimator are a plurality of serially-arranged Total Internal Reflection (TIR) components that operate to capture the light output from the collimator and redirect the light downward (or generally away from the luminaire device depending on the orientation thereof).

In accordance with a fundamental principal of the present invention, a substantial portion of the light that falls upon an input side of a first serially-arranged TIR component is reflected downward and away from the luminaire. Any leakage of light (i.e., light that is not reflected as a result of TIR within the first serially-arranged TIR component) falls upon an input side of a second or successive TIR component.

By using a succession of TIR components, it is possible to manufacture an efficient luminaire device without expensive and complicated metallized coatings on TIR components. That is, by employing two or more serially-arranged TIR components (which can be inexpensively manufactured, as for example via injection molding an optical-grade polymer such as acrylic), it is still possible to ensure that virtually all of the light that passes through the collimator is redirected downward in a desirable fashion, e.g., in accordance with the ISO standard, without having to rely on expensive metallized coatings on the TIR components.

In one variation of the first embodiment of the present invention the serially-arranged TIR components comprise standard prisms that are formed integrally with one another or are formed of individual components that are mounted on a common substrate. In another variant of the first embodiment of the present invention, the TIR components comprise serially-arranged solid sawtooth waveguides. In still another variant of the first embodiment of the present invention, a symmetrical luminaire is provided in which lamps and reflectors are located on either side of a luminaire waveguide structure and the TIR components are arranged opposite one another in a "mirror image-like" fashion.

In yet another variant, the curved reflector partially surrounding the lamp is augmented by a refractive medium thereby making it possible to reduce the overall size of the reflector or reflectors.

In a second embodiment of the present invention, the input and output sides of a collimator are arranged such that light passes vertically through the collimator such that the need for a waveguide (and even TIR components in some cases) may be reduced or even eliminated. In a preferred implementation of the second embodiment, a light control film is provided at either the input or output of the collimator (or both) to preclude direct view of the lamp and/or to diffuse light.

In a third embodiment of the present invention a solid waveguide having a sawtooth pattern on a hypotenuse side thereof is provided adjacent the output of the collimator. In accordance with this embodiment of the present invention, the individual facets of the sawtooth feature of the waveguide reflect light received from the collimator and capture and redirect leakage light that might leak through facets closer to the output of the collimator.

In a fourth embodiment of the present invention, a luminaire device with a hollow cavity waveguide is provided. This embodiment preferably includes an uncoated sawtooth film that is used as a light extraction feature.

In a fifth embodiment of the present invention and one that is related to the fourth embodiment, a solid acrylic slab is positioned adjacent a portion of an output side of a collimator and extends a predetermined distance into a hollow cavity waveguide of a luminaire. The slab can be comprised of any material that has refractive characteristics sufficient to "push" light further down the waveguide thereby improving uniformity of light distribution over the length of the luminaire.

The foregoing embodiments and other features and attendant advantages of the present invention will be fully understood by referring to the following detailed description in conjunction with the accompanying drawings.

BRIEF DESCRIPTION OF THE DRAWINGS

FIGS. 7A–7E show features of a second embodiment according to the present invention.

DETAILED DESCRIPTION OF THE INVENTION

First Embodiment

Figure 1:
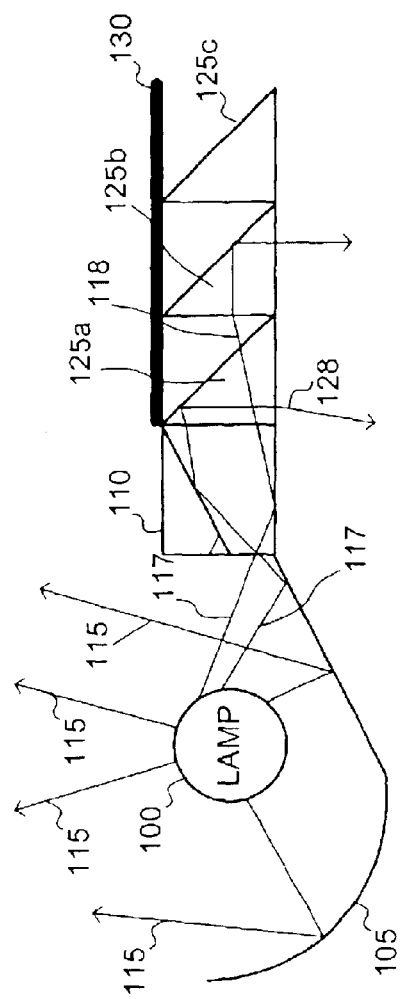
FIGS. 1 and 2 show an element of a first embodiment in accordance with the present invention.
Figure 2:
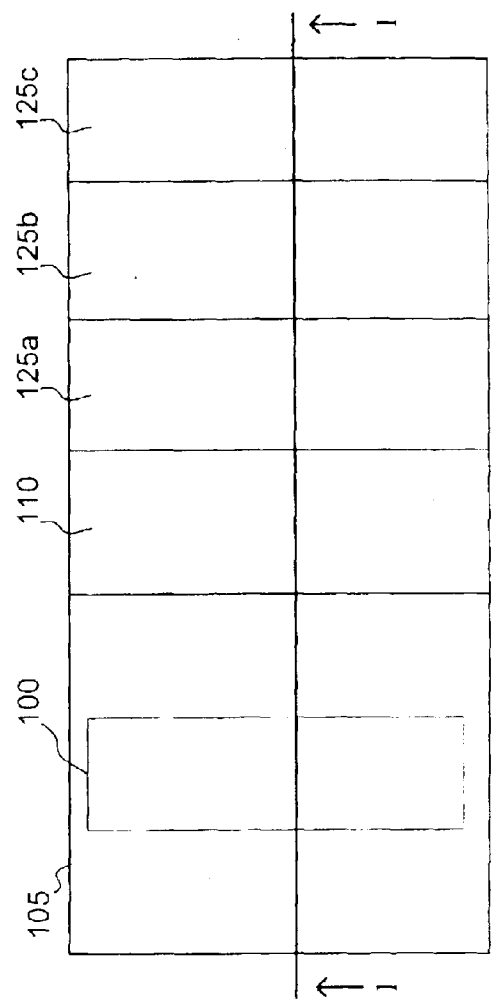

FIGS. 1 and 2 show orthogonal views of an element of a first embodiment according to the present invention in which a tubular lamp 100 is located within a concave portion of a curved reflector 105. Adjacent to lamp 100 is a collimator 110 that receives light that is not directed upward. The element of FIGS. 1 and 2 is serially arranged in a linear array to span the length of the tubular fluorescent lamp. It should be understood by those skilled in the art that the term "collimator" is used herein to encompass either a rectangular cross-section hollow collimator array or a triangular hollow collimator array (the latter described in U.S. Pat. No. 6,428,198). A "collimator" as used herein is also intended to encompass either a hollow collimator or a solid collimator, the latter being comprised of a light-transmitting refractive medium—typically a polymer material. An array of solid collimators can comprise elements that are much smaller than those of a hollow collimator thereby making it possible to make an array of solid collimators much thinner than an array of hollow collimators. Arrays of these smaller collimators are preferably two-dimensional arrays in order to capture the same solid angle of light flux projected from the lamp as that captured by the one-dimensional (linear) array of larger collimators. Arrays of smaller solid collimators can be fabricated by photo-lithography or by a molding process. Arrays of larger hollow collimators can be formed from specularly reflecting sheet metal, such as produced by Material Sciences, Inc., (Elk Grove Village, Ill.) going by the trade name Specular+.

Light that enters collimator 110 is directed substantially horizontally (to the right in FIG. 1) towards at least two serially-arranged Total Internal Reflection (TIR) components. In the case of FIG. 1, three prisms 125a, 125b and 125c are arranged in succession and parallel to each other as shown also in FIG. 2. Prisms 125a, 125b, 125c may be formed integrally with another or may be individual components that are mounted on a common substrate (not shown). Preferably, a flat reflector 130 is positioned above the serially-arranged TIR components 125a–c to force substantially all of the light rays that have passed through collimator 110 through the successive TIR components.

More specifically, rays 115 emanating from lamp 100 are directed upward or are reflected off of curved reflector 105 towards the ceiling of a room in which the luminaire structure is located. On the other hand, rays 117 are reflected or are directed directly into collimator 110, which collimates the rays and causes them to fall on a first side of prism 125a. While most of the light entering prism 125a is deflected downward (ray 128) in accordance with TIR principles, some light, indicated by ray 118, leaks through the hypotenuse side of prism 125a. This leakage falls on a side of second prism 125b, such that almost all of the light that passes through collimator is ultimately deflected down in compliance with the angle requirements of ISO 5035/7. Yet another prism, 125c, or still additional prisms, can be employed serially as shown to deflect any light that might leak through the second or successive TIR components. Thus, in accordance with a principle of the present invention, substantially all of the light that is not directed upward is directed first through a collimator and then downward in a desirable fashion.

One significant advantage of this first embodiment (as well as other embodiments described below) is that there is no need (or a reduced need) for metallized coatings on certain light distributing optics (such as TIR components), thereby resulting in significant cost savings. In the case of prisms, such metallized coatings are typically located on the hypotenuse of the prism. In accordance with the principles of the present invention, it is possible to eliminate these coatings by using the total internal reflection (TIR) properties of successive optics to direct an incident light beam in the desired fashion.

It is noted that an overall specular enclosure (only one piece, 130, is shown) may be desirable (or necessary in certain applications) to guide the rays from one optic to the next.

In one theoretical experiment on a luminaire in accordance with this first embodiment, carried out with a software package known as ASAP Pro (Breault Research Organization, Tucson, Ariz.), performance targets were set as follows:

a) an overall efficiency of 80% (% of the lamp's light output that is output by the luminaire)

b) 80% of the luminaire's light output to be directed upward (i.e. Up Flux)

c) 20% of the luminaire's light output to be directed downward (i.e. Down Flux)

Figure 3:
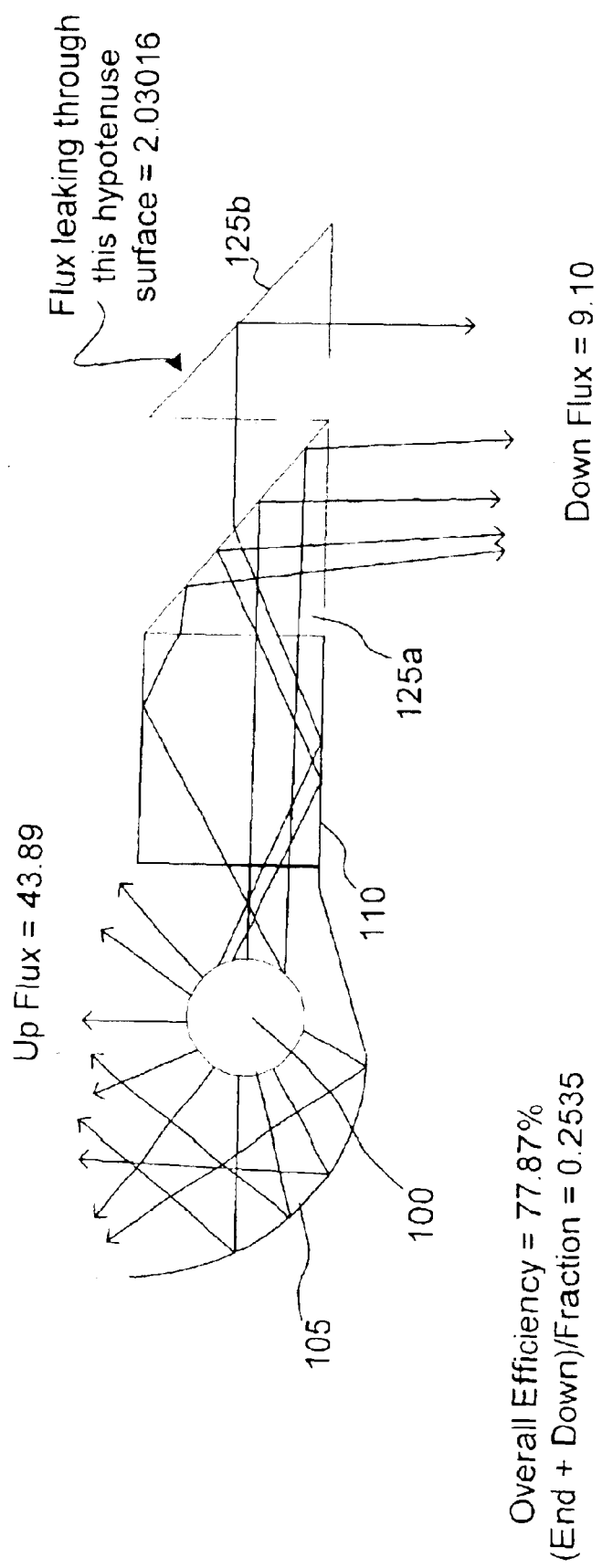
FIG. 3 illustrates results from a theoretical experiment modeling the first embodiment of the present invention.

The results from this theoretical experiment, in which a tandem arrangement of TIR components was used, are shown in FIG. 3.

Figure 4:
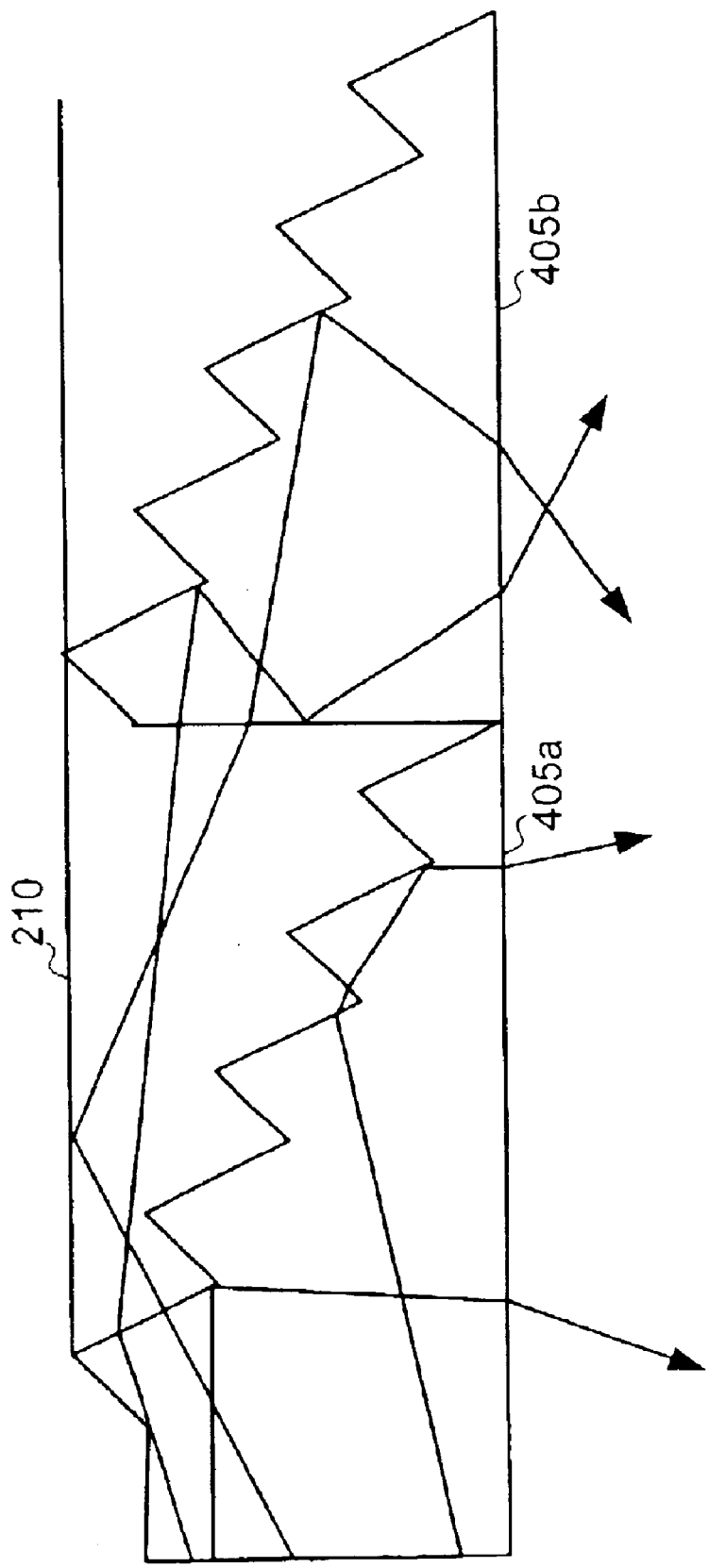
FIG. 4 shows a variant of the first embodiment of the present invention including solid sawtooth waveguides.

FIG. 4 shows a variant of the first embodiment wherein sawtooth waveguides 405a, 405b are employed as the serially-arranged TIR components. The lamp and adjacent collimator are not shown, but would be arranged to the left of the TIR components in FIG. 4. As illustrated, light rays that leak through any individual "tooth" in the first sawtooth waveguide can be picked up by the second sawtooth waveguide and deflected downward. Alternatively, the light rays that leak through can be reflected from mirror surface 210 before being picked up by the second sawtooth waveguide and deflected downward. Accordingly, this arrangement generates a down light directional distribution that is in compliance with a standard such as ISO 5035/7. One advantage of this variant is that Light flux density at the waveguide exit ports is spread over a larger area than that of the standard prisms shown in FIG. 3 thereby reducing glare from the down-light projected from the waveguide exit ports.

Figure 5:
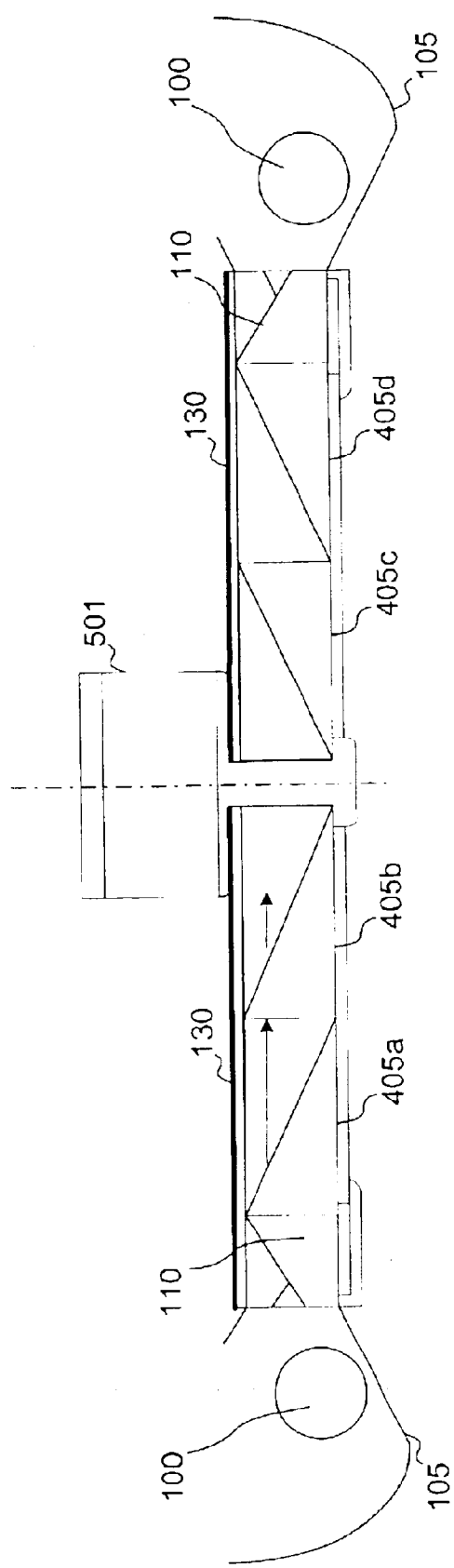
FIG. 5 shows still another variant of the first embodiment of the present invention.

FIG. 5 shows still another variant of the first embodiment wherein the serially-arranged TIR components are employed in an overall fixture including a hanger 501 and two opposing pairs of serially-arranged TIR components 405a, 405b and 405c, 405d. Opposing lamps 100, curved reflectors 105 and collimator arrays 110 are also provided. This arrangement provides an aesthetically balanced fixture while throwing twice as much light as a single lamp configuration. Consistent with the principles of the first embodiment, light from lamps 100 is either directed upward or falls on the respective collimators. The light that passes through the collimators falls on a first TIR component and any leakage from the first TIR component is applied to a second or successive TIR component such that leakage out of a last TIR component is insignificant.

As shown, the overall fixture or luminaire includes a reflector 130 (a portion only of which is visible in FIG. 5) to direct TIR leakage rays back into the individual TIR components. Preferably, the TIR components are uncoated thereby reducing the cost associated with manufacturing the luminaire.

Figure 6:
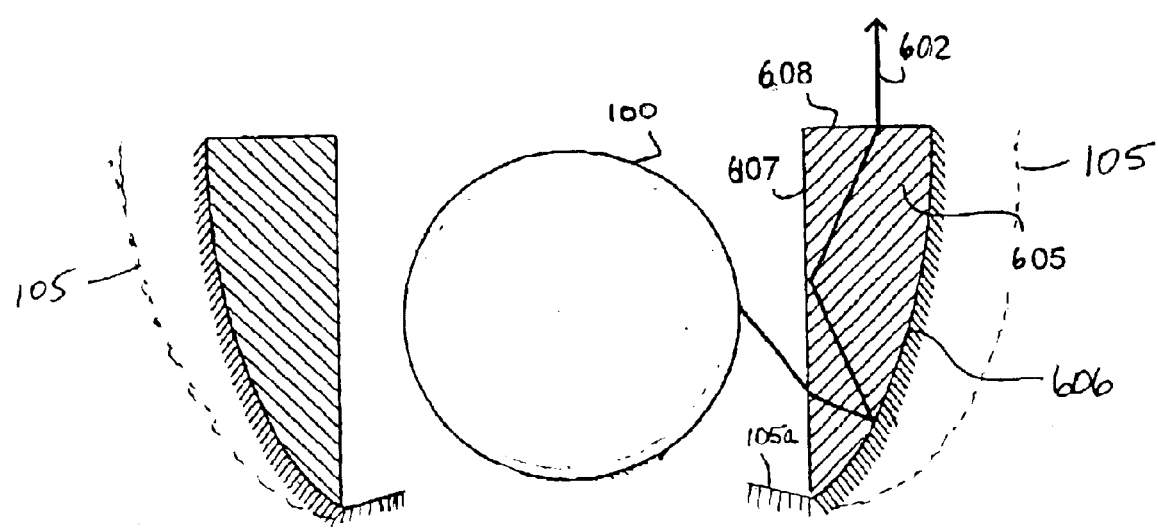
FIG. 6 shows a curved reflector including a refracting medium in accordance with the present invention.

The dimensions of curved reflector 105 are typically a function of the size of lamp 100 and the overall dimension of the luminaire device. FIG. 6 shows one way of reducing the size of reflector 105 such that the luminaire can be accommodated in smaller spaces and to allow more luminaires to be adjacent each other in a given space. For simplicity, collimators and the serially-arranged TIR components are not shown.

Referring to FIG. 6, a transparent refractive medium 605 is mounted on reflector 105a (reflector 105 is shown by a dotted line). Transparent refractor 605 includes a curved reflective surface 606, a first flat surface 607 facing lamp 100, and a second flat surface 608 facing generally outward from reflector 105a. Transparent refractor 605 is advantageously composed from a solid refractive medium, such as glass or plastic.

A light ray 602 from lamp 100 entering transparent refractor 605 is refracted normal to curved reflective surface 606 and propagates by total internal reflection until exiting transparent refractor 605 via second surface 608.

The refractive medium makes it possible to alter the shape of the required reflective surface, comprising reflector 105a and curved reflector surface 606, resulting in an assembly that is more compact than reflector 105. As shown in FIG. 6, the vertical span of the reflector is reduced while allowing no rays entering the refractive medium to be directed back to the lamp surface. Although described in connection with this first embodiment, the use of a refractive medium consistent with the above description can be employed in any embodiment described herein that incorporates a curved or multi-faceted reflector that surrounds a lamp.

Figure 6A:
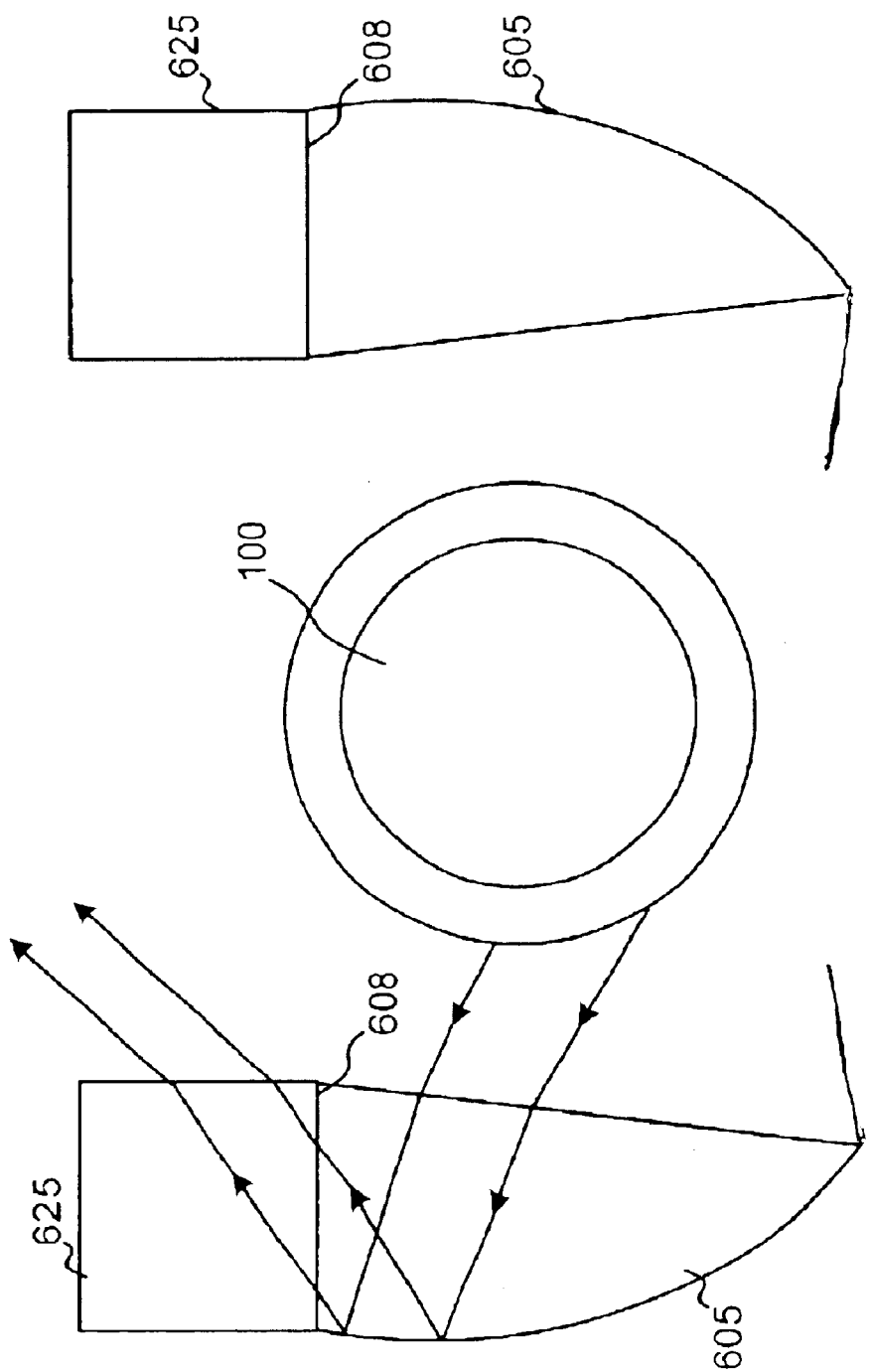
FIG. 6A shows a variation of the reflector shown in FIG. 6, including a light pipe to reduce or eliminate TIR reflections back to an adjacent lamp.

FIG. 6A shows a variation of the assembly depicted in FIG. 6. In this configuration, refractive medium 605 is given a slanted orientation compared with that of FIG. 6. Also, a rectangular light pipe 625 has been added to second surface 608. As shown by the several rays in FIG. 6A, light that might otherwise reflect back to lamp 100 is prevented from doing so. Ideally, refractive medium 605 and rectangular light pipe 625 comprise a monolithic structure. However, the curved surface of refractive medium 605 is preferably mirror coated to prevent light form leaking through. Other flat surfaces of refractive medium 605 and light pipe 625 preferably remain uncoated, unless the coating is, for example, an anti-reflection coating.

Second Embodiment

Figure 7E:
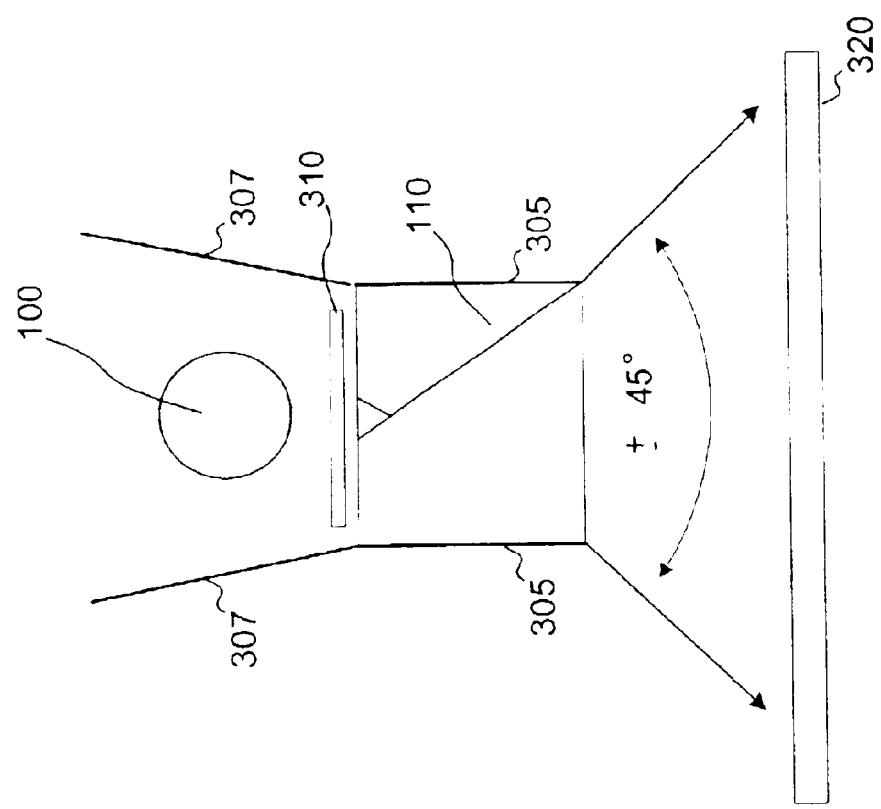

FIGS. 7A–7E show features of a second embodiment according to the present invention. FIG. 7A illustrates the basic configuration of this second embodiment, which includes a lamp 100 (mounted as desired in a lamp holder) and hollow collimators 110, which preferably comprise tapered surfaces having a specular coating thereon (although solid collimators could also be employed). Side reflectors 305 are preferably provided to cap collimators 110 and to prevent direct view of lamp 100. In addition, a pre-collimator optional light control film 310 can be employed to preclude direct-view of lamp 100 through collimators 110. Such films can be engineered diffusers or prismatic structures as is known in the art. Further, while optional film 310 is shown parallel to the input apertures of collimators 110, it can also be tilted or formed to provide the desired effect.

FIG. 7B shows another configuration in which angled side reflectors 307 are provided adjacent to lamp 100, instead of the flat side reflectors shown in FIG. 7A. FIG. 7C shows yet another configuration according to the second embodiment. Here, curved reflectors 105 take the place of both the flat reflectors or angled reflectors shown in FIGS. 7A and 7B. FIG. 7D shows two alternative additional features including (i) the possibility of arranging two or more modular luminaire units together in a single fixture and (ii) employing an optional post-collimator light control film or diffusion screen 320 to add aesthetic qualities to the fixture and/or to provide additional light control. Diffuser screen 320 is described more fully below.

FIG. 7E depicts how a post-collimator light control film 320 (e.g. a fresnel structure, prism/lens array, etc) might be located at a distance away from the output of collimator 110, while still intercepting substantially all light exiting collimator 110. This functionally reduces the surface luminance of the luminaire by spreading the lumens exiting collimator 110 over a larger area. For someone looking directly up at the fixture, the configuration of FIG. 7E would be perceived as having a softer glow than the configuration shown in FIGS. 7A–C. Such post-collimator sheet technology may be available from Norton Industries (Lakewood, Ohio) or Reflexite (Avon, Conn.).

Figure 8B:
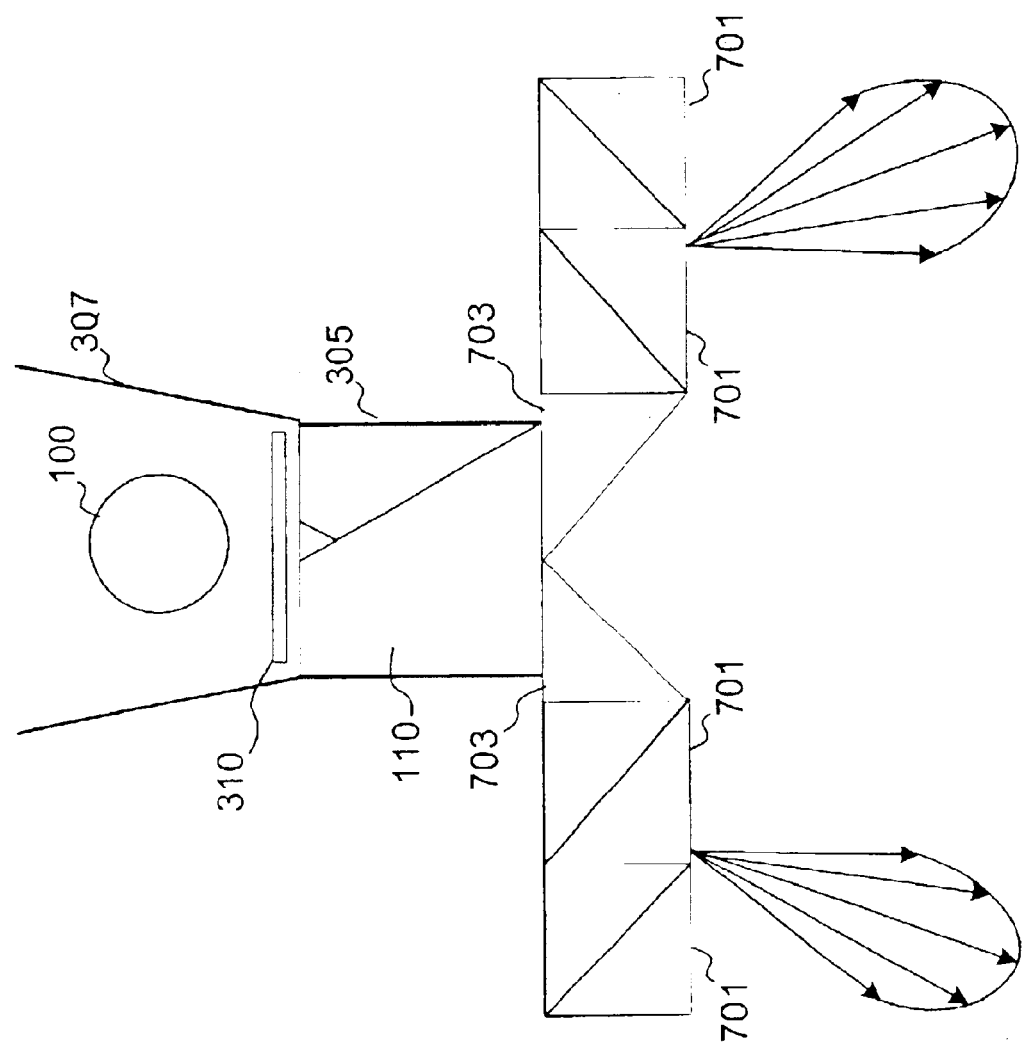
FIGS. 8A and B show a variant of the second embodiment of the present invention.

FIGS. 8A and 8B show a variant of the second embodiment wherein a collection of TIR components, in this case prisms 701, 703 is arranged beneath collimator 110. In FIG. 8A some portion of the light exiting collimator 110 avoids prisms 701 altogether due to a gap 705 that is provided between some of the prisms 701. Other light is captured by the pair of prisms 703 having at least a portion thereof directly in line with the output of collimator 110. Light captured by these prisms is internally reflected and passed to the adjacent serially-arranged prisms, whereby light is transmitted downward in the same manner described earlier, including the principles of capturing leakage and passing the same to successive TIR components. Note that depending upon the refractive index of prisms 703 and the divergence exiting collimator 110, some light may leak through the hypotenuse of prisms 703 (not shown).

FIG. 8B is very similar to the configuration depicted in FIG. 8A except that gap 705 is removed such that substantially all of the light exiting collimator 110 is passed to at least one prism 703, thereby causing the light to be passed to the remaining serially-arranged TIR components 701. Note that depending upon the refractive index of prisms 703 and the divergence exiting collimator 110, some light may leak through the hypotenuse of prisms 703 (not shown).

This second embodiment shows a variety of features not included in the first embodiment, namely:

Vertical orientation of the collimators 110 thereby eliminating the need for a relatively large waveguide to extract light and to direct it downward;

Addition of a pre-collimator light control structure to avoid a direct view of the lamp through the collimator;

Relatively simple modular design as shown, for example, by FIG. 6D;

Addition of light control film 320 to widen the luminous region of the luminaire to generate a superior aesthetic appearance. (The same amount of light projected from a substantially smaller area has a considerably higher luminance, which is less aesthetically pleasing and which can produce disturbing glare reflections from the objects illuminated); and The use of several commercially-available off-the-shelf products that can be used as an alternative to Light Control Film (e.g. 3M's BEF for the pre-collimator light control film, Norton Industries or Reflexite for post-collimator prismatic sheets, Material Sciences Specular+ reflector material).

Figure 9:
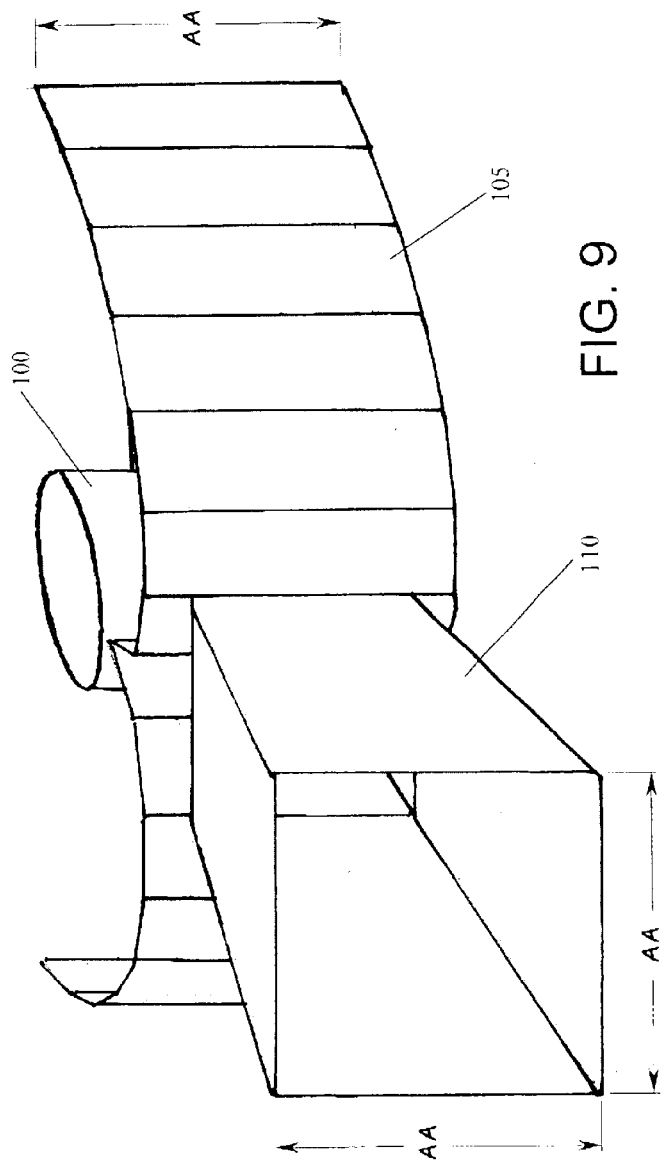
FIGS. 9–11 show an exemplary implementation of the present invention for which performance results were generated using computerized modeling techniques.
Figure 10:
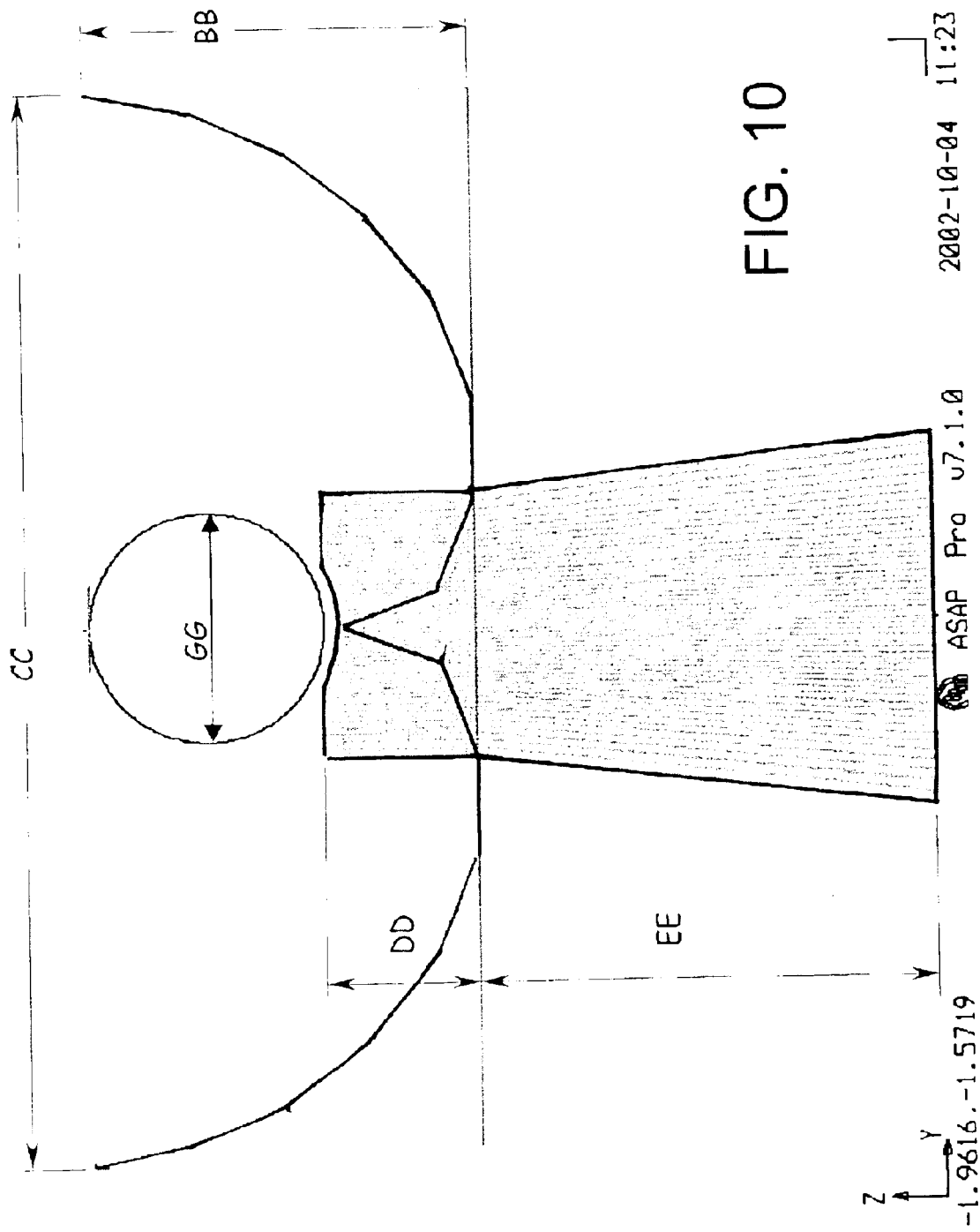
Figure 11:
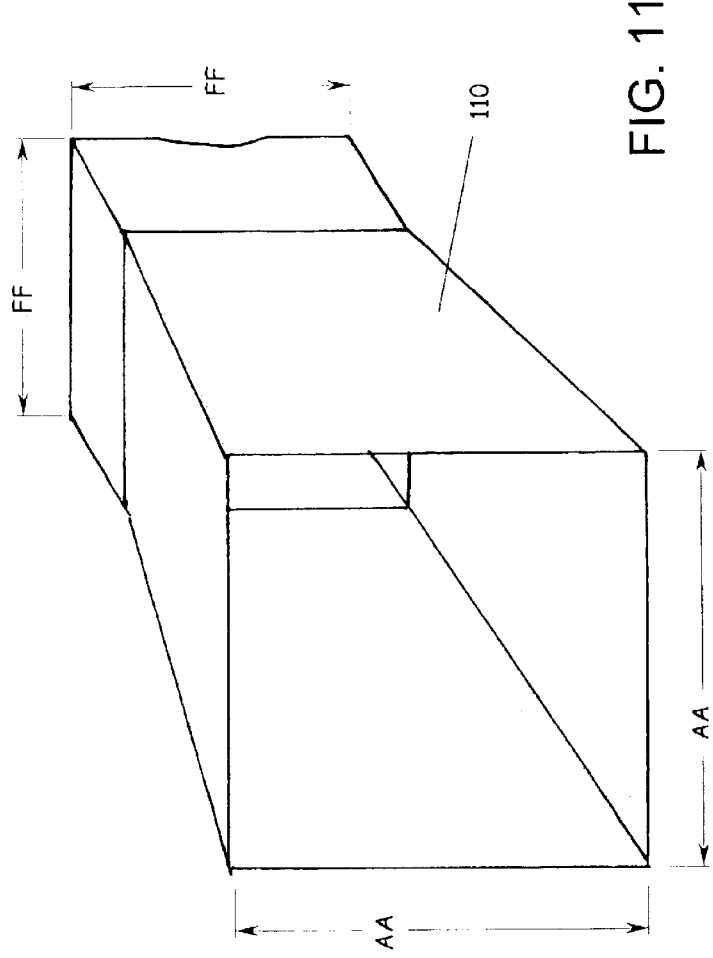

It is also possible to replace curved reflector 105 with a multi-faceted curved reflector like that shown in FIGS. 9–11. Such a luminaire combines a hollow lenticular faceted mirror for projecting up-light flux with one, or an array of, square cross-section tapered hollow tubular reflectors (collimators) for projecting down-light flux. The faceted mirror preferably includes a cusp below the lamp to bring downward-projected light from the lamp around the lamp and upward toward the ceiling. The mirror facets disposed around the lamp are preferably angled such that lamp light reflections back to the lamp surface are totally, or at least substantially, avoided. This both maximizes light extracted from the lamp and minimizes heat retention by the luminaire. The array of tapered hollow tubular mirror cavities (e.g., collimators) forms compartments within the faceted mirror and distinct from it. Accordingly, the mirror cavities are devoid of cusp reflector mirrors. Each tubular mirror cavity at least partially collimates the down lamp light flux it intercepts and projects it downward toward the floor. Preferably, the mirror surfaces have a specular reflectance of 90%, or greater. Of course, as the width of the mirror facets approaches zero, the lenticular mirror around the fluorescent lamp becomes a continuous curve, which will then look like curved reflector 105. Dimensions (in inches) of the several components as shown in FIGS. 9–11 are:

AA: 1.0153
BB: 1.0392
CC: 2.9244
DD: 0.4089
EE: 1.2255
FF: 0.7179
GG: 0.630
Width of each facet: 0.280
These dimensions are exemplary only and are not meant to limit the scope of this invention.

Figure 12:
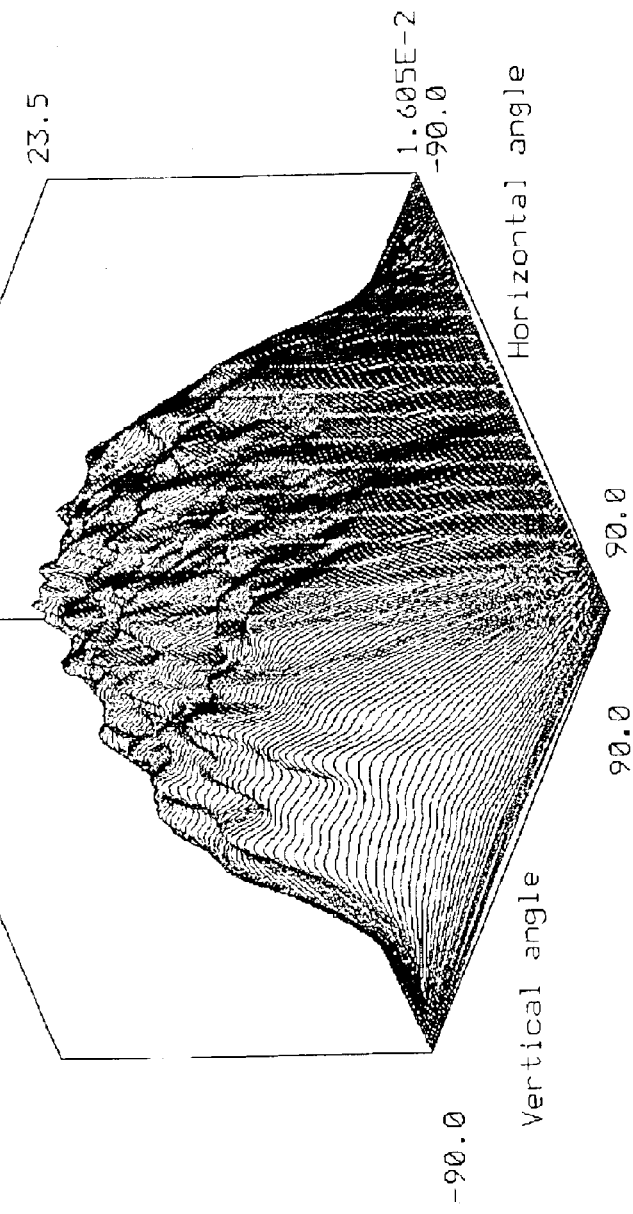
FIGS. 12 and 13 show graphical results of the modeled exemplary implementation of FIGS. 9–11.
Figure 13:
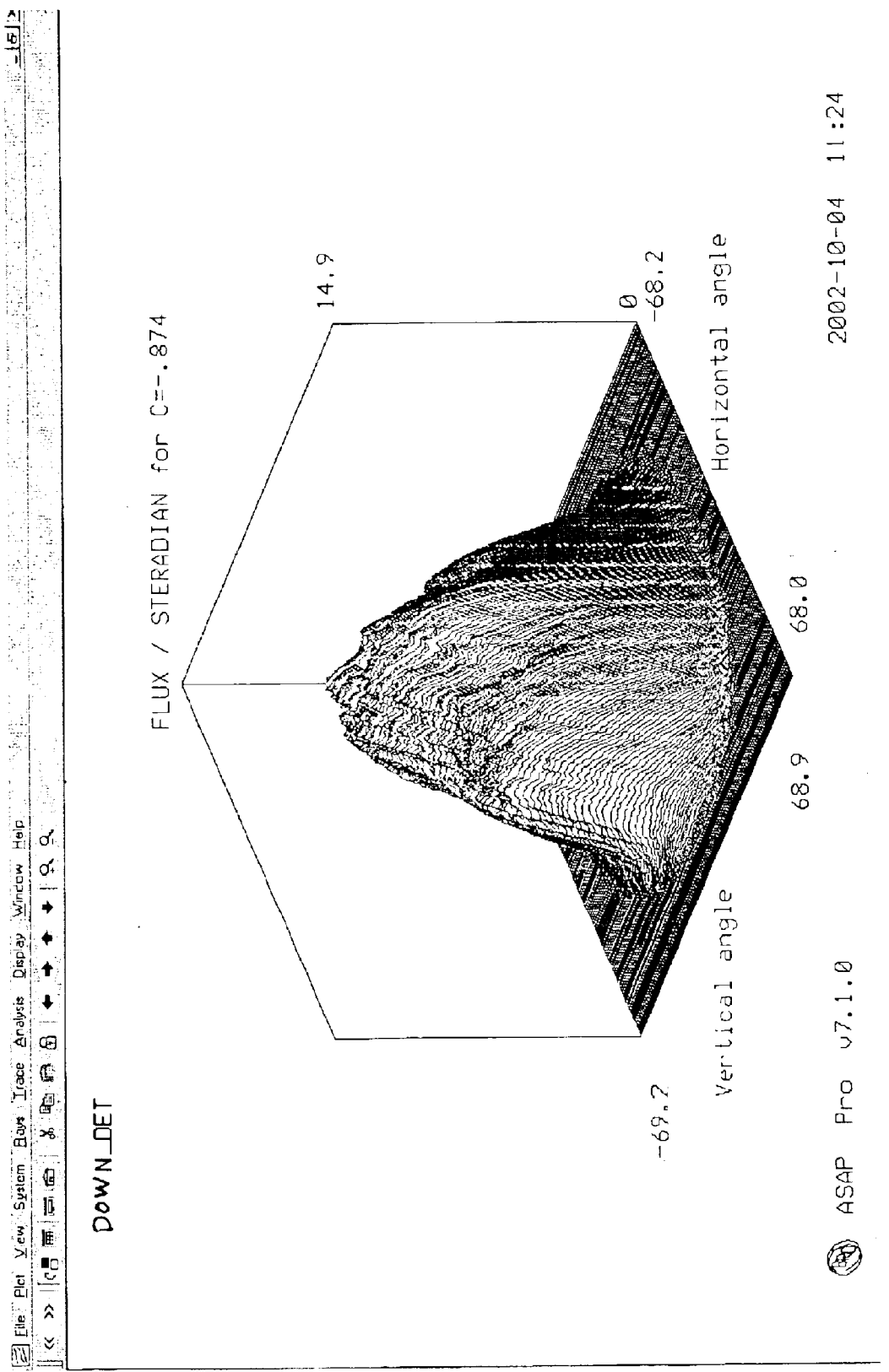

FIGS. 12 and 13 are graphical output results from an ASAP execution run on a file that modeled the implementation of a multi-faceted curved reflector luminaire in accordance with the embodiment shown in FIGS. 9–11. The performance results are set forth immediately below and the input file on which the analysis was based is set forth thereafter in Appendix A.

Performance Results

| Object | Rays | Flux | |
|---|---|---|---|
| 0 | 17 | 0.850000E−02 | |
| 46 | 161931 | 78.5146 | UP_DET |
| 47 | 4 | 0.182994E−02 | TUBE1 |
| 48 | 1 | 0.475000E−03 | TUBE2 |
| 51 | 38047 | 16.8460 | DOWN_DET |
| TOTAL | 200000 | 95.3714 | |

Specular Reflectance of all Mirror Surfaces=95%
Total Lamp Flux Emitted=100%
Up-Light Flux=78.5%
Down-Light Flux=16.85%
Up/Down-Light Ratio=4.66
Overall Efficiency=95.4%

As mentioned above, a diffusion screen 320 may be disposed below collimator 110. Diffusion screen 320 is preferably arranged or selected to at least one of:

Capture the down light over an area larger than that of an exit port aperture;

Project captured rays from each area element of the capture area over a specified range of down angles relative to the floor normal; or Perform these functions with minimal light losses comprising only fresnel reflection losses at the input and output surfaces of diffusion screen 320 and slight internal light absorption by the refractive medium of diffusion screen 320.

Figure 14:
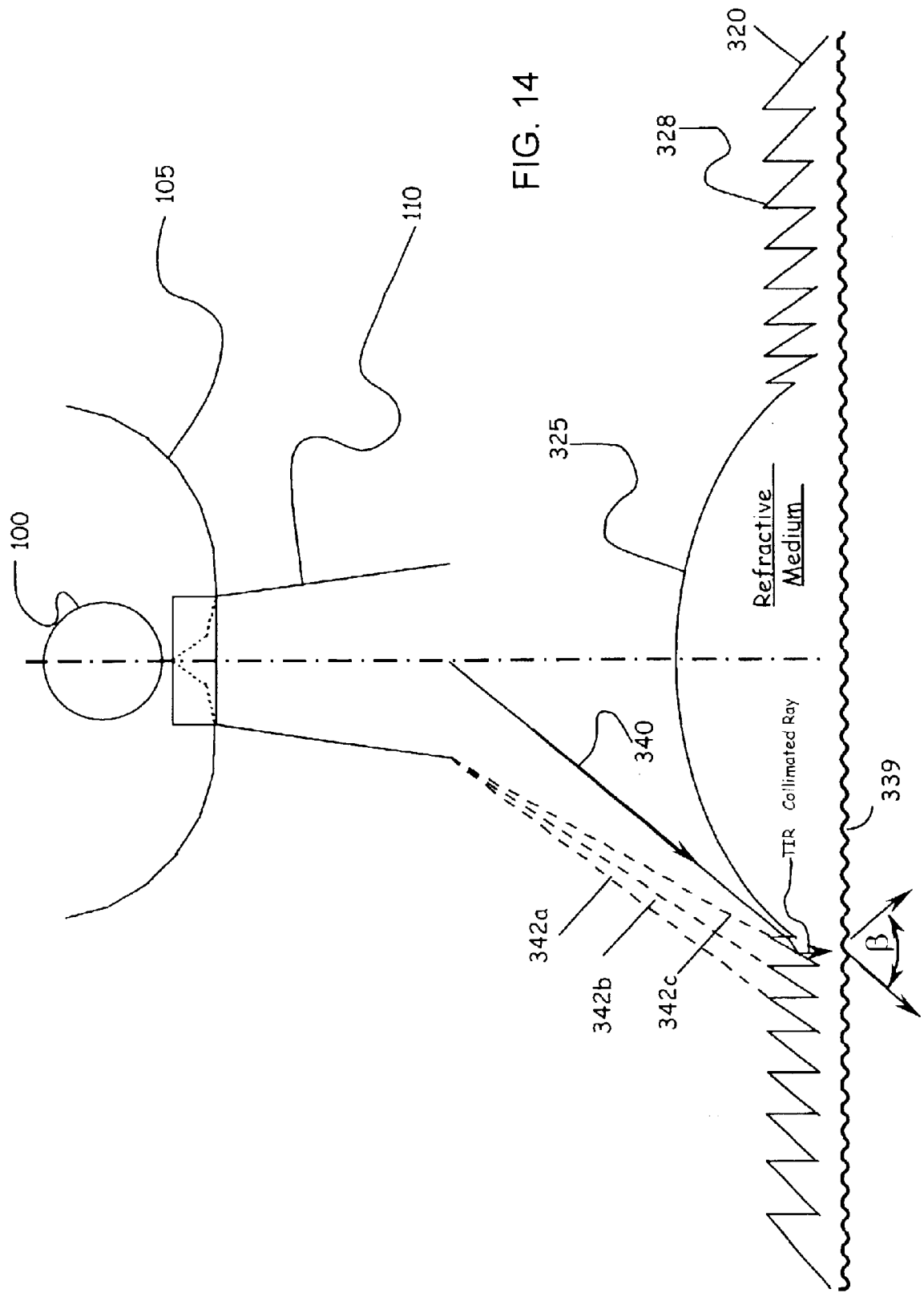
FIGS. 14–16 illustrate more detailed features of a diffusion screen disposed proximate an output end of a collimator in accordance with the present invention.

An embodiment of a luminaire/diffusion system is shown in FIG. 14. As before, the luminaire comprises a tubular (or lenticular) fluorescent lamp 100, an up-light projecting hollow lenticular cusp reflector disposed around lamp 100, a linear array of hollow collimating mirror cavities 110 arranged below the tubular lamp and along its length, and a screen or light collimating and diffusing element 320 positioned below and along the hollow mirror cavity array.

Collimator/diffuser 320 is preferably a thin refractive element with top and bottom surfaces having lenticularly structured features. The lenticular center of the top surface directly below the linear array of hollow mirror cavities preferably has a conventional cylindrical lens surface 325. Disposed adjacent to and on both sides of cylindrical lens 325 is a lenticular sawtooth structure 328. Each sawtooth feature preferably comprises a vertical light input facet and a hypotenuse facet. A light ray 340 projected from collimator 110 enters each of the vertical facets, is refracted into the diffuser medium, undergoes a total internal reflection (TIR) by a hypotenuse facet, and is thereby collimated to propagate vertically downward toward the bottom surface 339 of screen diffuser 320. The slope angle of the hypotenuse facet is preferably engineered to collimate ray 340 from the center of the exit port aperture of hollow collimator 110. Also, to prevent light from the exit port aperture from falling directly on any of the hypotenuse facets, these facets preferably have maximum slope angles 342a, 342b, 342c relative to vertical that may not be exceeded lest light from the exit port entering that facet be refracted in unwanted directions that deviate too far from collimated vertical propagation.

As sawtooth facet positions approach the vertical centerline of cylindrical lens 325, the hypotenuse facet angles will not be able to meet the collimation criterion and the slope angle limitation simultaneously. This will set a limit for the maximum distance of the boundary between the sawtooth facet arrays and the cylindrical lens edges and, thereby, will determine the minimum size of the cylindrical lens.

Figure 16:
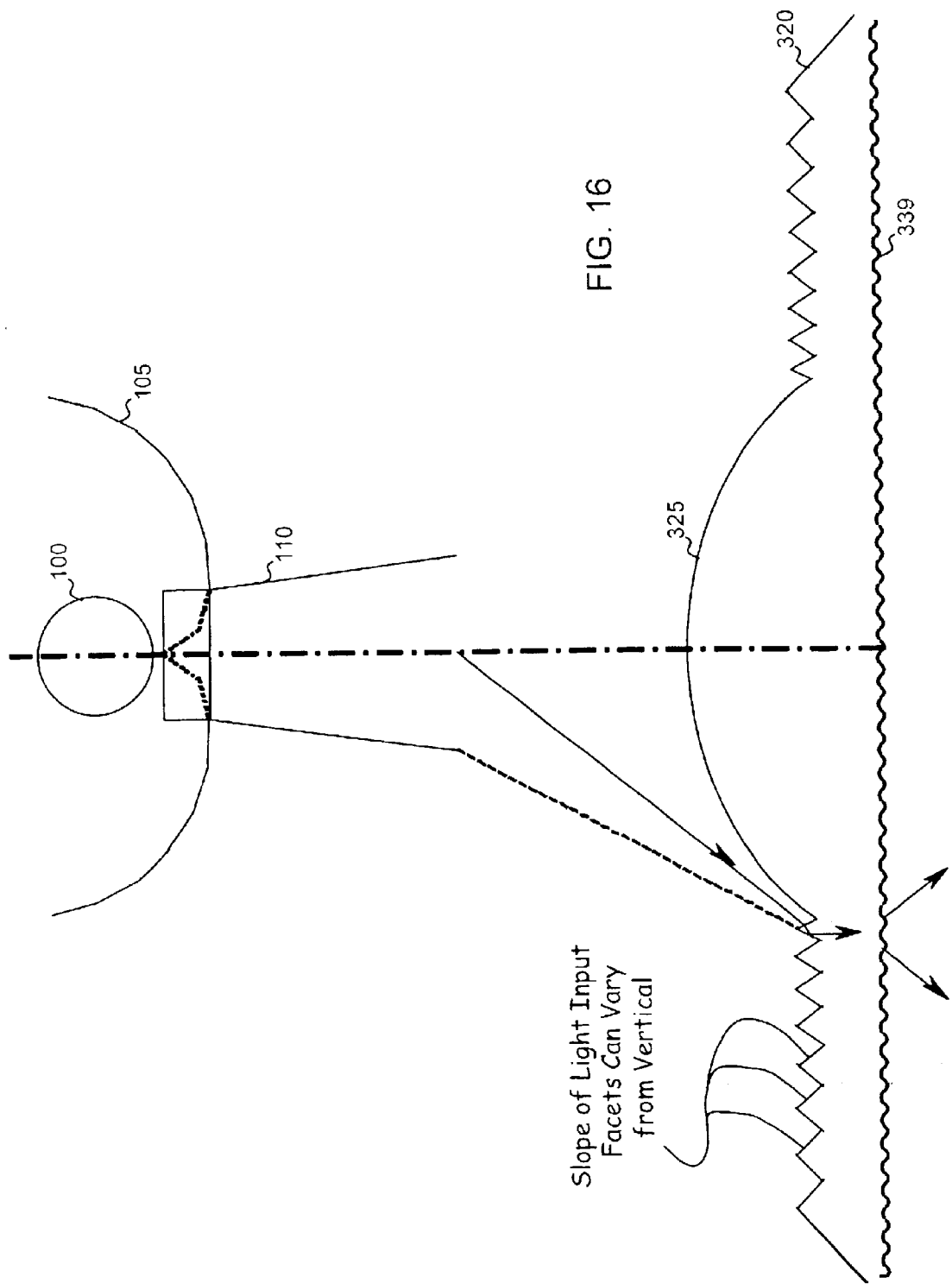

It is advantageous to minimize the size of lens 325 to minimize its thickness (compactness), weight, and aberrations. Accordingly, the sawtooth arrangement shown in FIG. 16 is a preferred implementation of this aspect of the present invention. It minimizes lens size by providing an additional degree of freedom to the vertical sawtooth facets by allowing their slope to vary from vertical. Accordingly, by engineering the hypotenuse facet slope and the corresponding vertical facet slope variation, it becomes possible to bring properly functioning sawtooth facets closer to the lens center. This brings the lens edges closer together and, thereby, reduces the size of the cylindrical lens section.

The facet slope engineering process adjusts each hypotenuse facet slope toward the vertical and the rotates the corresponding vertical facet slope in the same direction as this hypotenuse facet slope adjustment rotation. The resulting facet configuration increases the draft angle of the facets that were vertical prior to their slope adjustment. This increases the draft angles of the sawtooth features and, thereby, enhances the mold release process. As is known in the art, the molding processes for different materials each have a minimum draft angle below which the mold release process becomes difficult or untenable. For example, a typical specification for compression molding acrylic is for a draft angle equal to, or greater than, 3 degrees.

Also, by adjusting hypotenuse facet slope angles toward the vertical allows sawtooth features to exist closer to the lens surface centerline without causing their hypotenuse facets to have a direct view of the hollow collimator exit port apertures. This minimizes the cylindrical lens section size, thickness, and weight.

Note that light from lamp 100 may enter hollow collimator 110 at an angle approaching 90 degrees from vertical and project from its exit port aperture at a maximum angle approaching (for example) 60 degrees. (As defined here, collimation occurs when the limits of the output angles of an element are less than those of its input angles.)

Light projected from the array of hollow collimator exit ports diverges and is captured by the lenticular diffuser element 320 suspended at a distance below it. The diverging beams projected downward from each individual hollow collimator 110 may have substantial angular symmetry about its axis. However, the linear array of individual hollow collimators preferably includes a lenticular structure in the diffuser element they illuminate because the individual diverging beams projected from the array cross each other before they enter the diffuser. Accordingly, if a diffuser area element has structure that operates in the cross-lenticular direction, it will receive light incident from different directions in vertical planes parallel to the lenticular direction from a number of different hollow collimator elements of the array. Owing to these multi-directional light inputs, sawtooth features having cross-lenticular structure cannot project light from one directional input in a desired direction without also misdirecting light incident from other different directions. This establishes the need for the structured features of the diffuser to be lenticular with a length dimension parallel to the direction of the array.

The function of the collimator and diffuser element 320 comprises two separate actions. The top surface collimates light from the hollow collimators 110 in planes normal to the length direction of the lenticular features. The bottom surface diffuses the collimated light. The result produces illumination that may have angular projection properties similar to those from the hollow collimators. However, since the area of the diffuser element 320 exceeds that of the combined areas of the hollow collimator exit port apertures, its luminance is reduced and thereby generates less glare.

Figure 15:
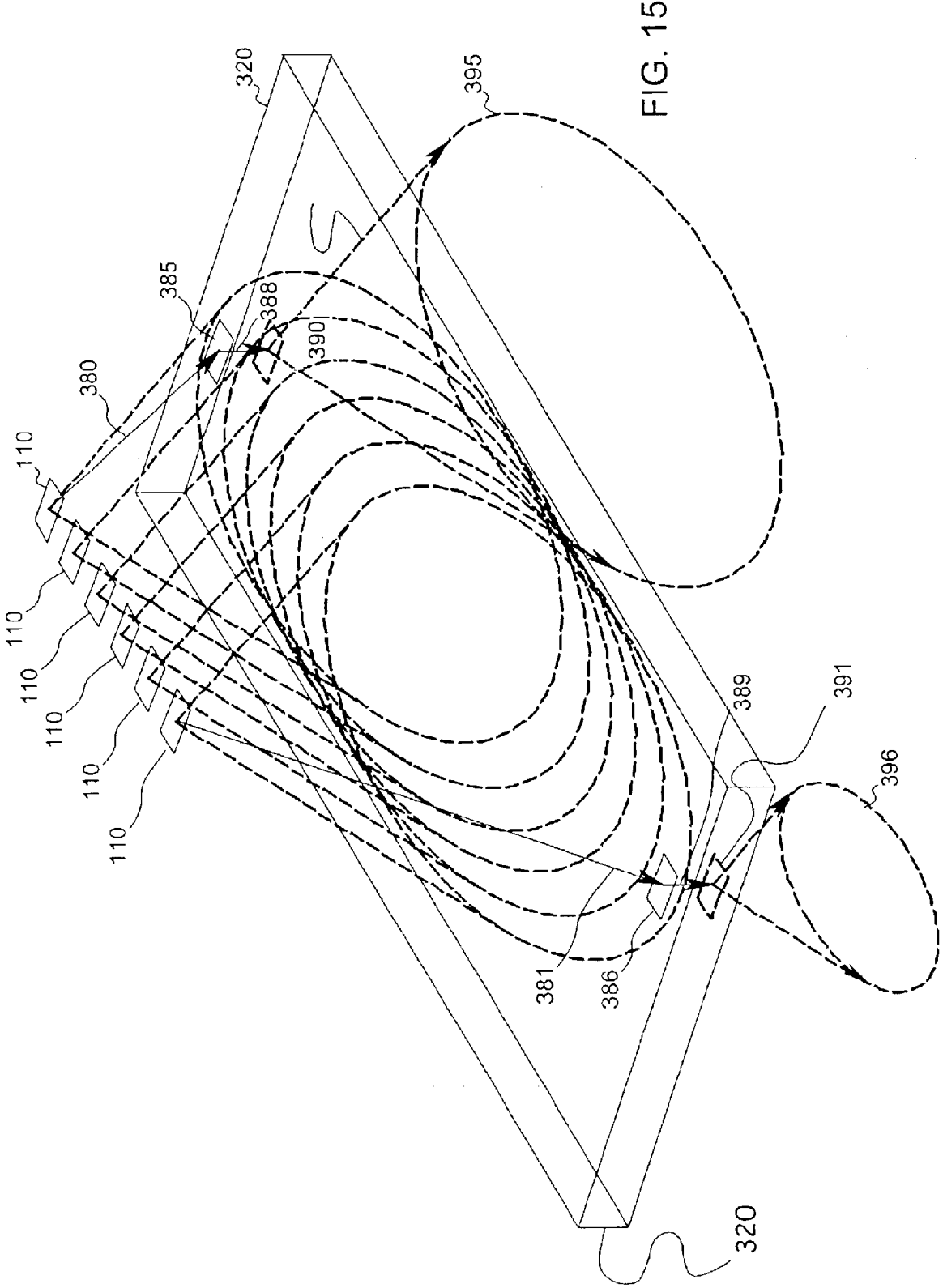

The isometric view of FIG. 15 illustrates the collimation/ diffusion process and the relationship of the elements of this process. FIG. 15 shows how a light beam of substantial solid angle is projected toward the collimator and diffuser element 320 from each exit port aperture of a linear array of hollow collimator elements 110. Two typical rays 380, 381 are shown, each within one of these beams and each propagating from an exit port aperture to a corresponding area element 385, 386 on the top surface of the collimator and diffuser element 320. The lenticular feature within each area element 385, 386 which would generally be either a cylindrical lens surface or the hypotenuse facet of a sawtooth element, collimates the rays 388, 389 and transmits them to corresponding area elements 390, 391 on the bottom surface of the collimator and diffuser element. The lenticular diffusion features 339 on the bottom surface and within each area element 390, 391 project rays intercepted by area elements 390, 391 into beams 395, 396 of similar solid angle to those projected from each exit port aperture.

Top Surface Collimation Action:

The cylindrical lens section preferably has a focal length equal to its distance below the hollow collimator exit port. Accordingly, it collimates the light it intercepts and projects it vertically downward. As previously mentioned, this collimation exists in planes normal to the length of the cylindrical lens section. The divergence of the beam thus collimated is approximately equal to plus or minus the arc tangent of [half the span of a hollow collimator exit port divided by the cylinder lens distance below that exit port]. This divergence may be considerably less than that projected from the hollow collimators. However, the divergence produced in a plane parallel to the length of the cylinder lens will be substantially equal to that projected from the hollow collimators because the lens has no power in that plane.

Each sawtooth element receives light from an exit port aperture over a small angular range. This range is approximately equal to the arc tangent of [the width of the aperture times the cosine of the sawtooth feature's line-of-sight angle relative to vertical (as seen from the aperture center) and divided by the line-of-sight distance between the aperture center and the sawtooth feature]. This angular range is, as previously mentioned, in planes normal to the length direction of the sawtooth features. As in the case of collimation by the cylinder lens, the angular divergence range in the orthogonal planes (parallel to the sawtooth feature length) will be substantially equal to that projected from the hollow collimators owing to the lenticular nature of the sawtooth features.

Bottom Surface Diffusion Action:

The bottom diffusing surface of the collimator and diffuser element can be lenticularly rippled as shown in FIGS. 14 and 16. The ripples are designed to spread the collimated light projected downward from collimating features on the top surface over an angle of β shown in FIG. 14 after emerging from the rippled surface. The spreading (or diffusing) action takes place in planes normal to the lenticular ripples. The shape of the ripples can control the angular distribution of light within the limits of β. For example, the ripples can be sinusoidally shaped, or they may a series of convex or concave cylindrical protrusions or depressions, or they may be a series of alternating convex/concave cylinders. And, of course, other lenticular ripple shapes are possible. Each option has its own characteristic angular distribution within β. The magnitude of β increases with increasing amplitude-to-pitch ratio of the ripples. The shape, amplitude, and pitch parameters of the ripples are design choices.

Alternative Collimation or Diffusion Methods:

Those skilled in the art can apply other collimation or diffusion techniques known in the art, such as means using holographic or binary optical sciences.

Implementations using Different Lamp Types:

It is noted that the present invention can be modified to accommodate lamp types other than tubular fluorescent lamps. For instance, the present invention can also be used with lamps having compact light-emitting elements such as lamps with tungsten filaments, short arc high intensity discharge lamps, or lamps of the ceramic metal halide (CMH) type. Such lamps are nearer to being point sources than tubular fluorescent lamps and therefore require luminaire designs that have substantial radial symmetry around the emitting element rather than designs of a lenticular nature.

For example a luminaire in accordance with the present invention can be designed to accommodate the CMH lamps such as the well-known TD-7, T-4, T-6, ED-17 and ED-18 bulbs, which have an extraordinarily high luminous efficiency. For these lamps, the cusp up-light reflector of the luminaire is a surface of revolution about the vertical axis through the center of the CMH lamp's light-emitting element. A single hollow collimator below the light-emitting element can have tapered cross-sections that are square, rectangular (near square), circular, elliptical (near circular), or a mix of these cross-sectional shapes. The collimator/diffuser element below the hollow collimator element exit port aperture preferably has a cross-sectional shape that is radially symmetric about the vertical axis through the center of the CMH lamp's light-emitting element. Accordingly, the lens on the top surface of an associated collimator/diffuser element 320 preferably has a spherical rather than a cylindrical shape, the sawtooth features on the top surface have conical rather than lenticular surfaces, and the light-diffusing ripples on the bottom surface are radially symmetric about the lens axis rather than lenticular.

Alternative Shapes of the Collimating Lens in the Center of the Top Surface:

For superior collimation performance by avoidance of spherical aberration, the center lens can be aspheric rather than spherical. Alternatively, it can be a conventional fresnel lens. The latter will have some scattering light losses from the non-collimating fresnel lens facets between adjacent collimating fresnel lens facets.

For lenticular embodiments of this invention, the sphere will be a two-dimensional uniform lenticular cross-section and the fresnel lens will be a lenticular type.

Fresnel lenses have the advantage of greater compactness and lower weight than the spherical, cylindrical, and aspheric lens alternatives.

Luminaire Array Options:

The luminaire embodiments disclosed herein can be arranged in patterns of multiple units. For example, implementations with tubular fluorescent lamps can be arranged in a radial configuration of units that resemble the spokes of a wheel. Alternatively, they can be arranged in a linear array of multiple units with the array direction normal to the lenticular luminaire direction. For very large areas requiring illumination, they can be arranged in a rectangular array of n by m multiple units, where n and m are positive integers. Similarly, embodiments with lamps having compact light-emitting elements can also be arranged in linear array fashion or in rectangular array fashion.

Fabrication Options:

The collimator/diffuser element is preferably made from an optically clear refractive medium such as glass or plastic to maintain low light absorption losses. Plastics such as acrylic, polycarbonate, polystyrene, and topas are options.

The top and bottom surface features can be produced by mechanical cutting methods, or they may be molded. Another alternative would be to generate the top or bottom surface features separately on a thin substrate or roll of material that can be laminated to a substrate.

Circular Bulbs

Figure 17:
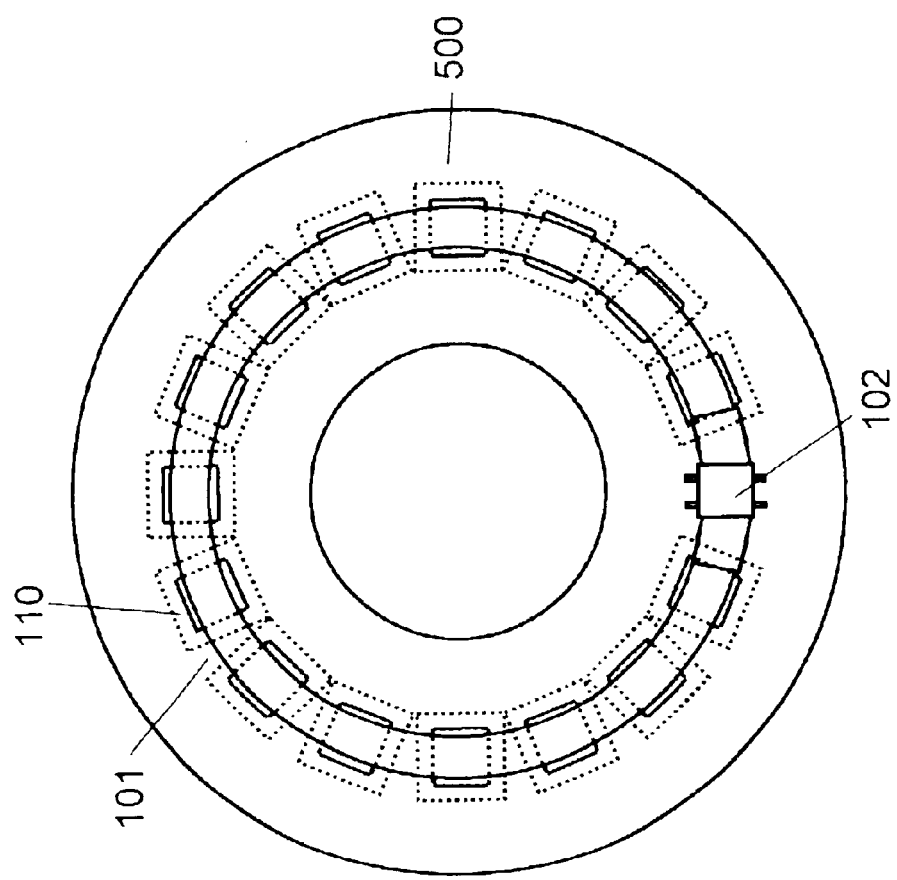
FIG. 17 shows an exemplary implementation of the present invention that incorporates a circular fluorescent bulb.

T5 circular bulbs are now also available and are becoming increasingly popular. FIG. 17 shows how one possible configuration for accommodating such bulbs. FIG. 17 is a view of the luminaire as it would be seen from above (i.e., from the ceiling). The inner and outer circles represent an upward-reflecting cusp mirror 500 that has a substantially radial symmetry around the vertical. Circular lamp 101 with electrical connector 102 is suspended within the channel of mirror 500. A plurality of downward pointing collimators 110 are arranged immediately below bulb 101 such that light emanating from bulb 101 passes directly through collimators 110 or is reflected off of mirror 500 as described above.

Third Embodiment

Figure 18A:
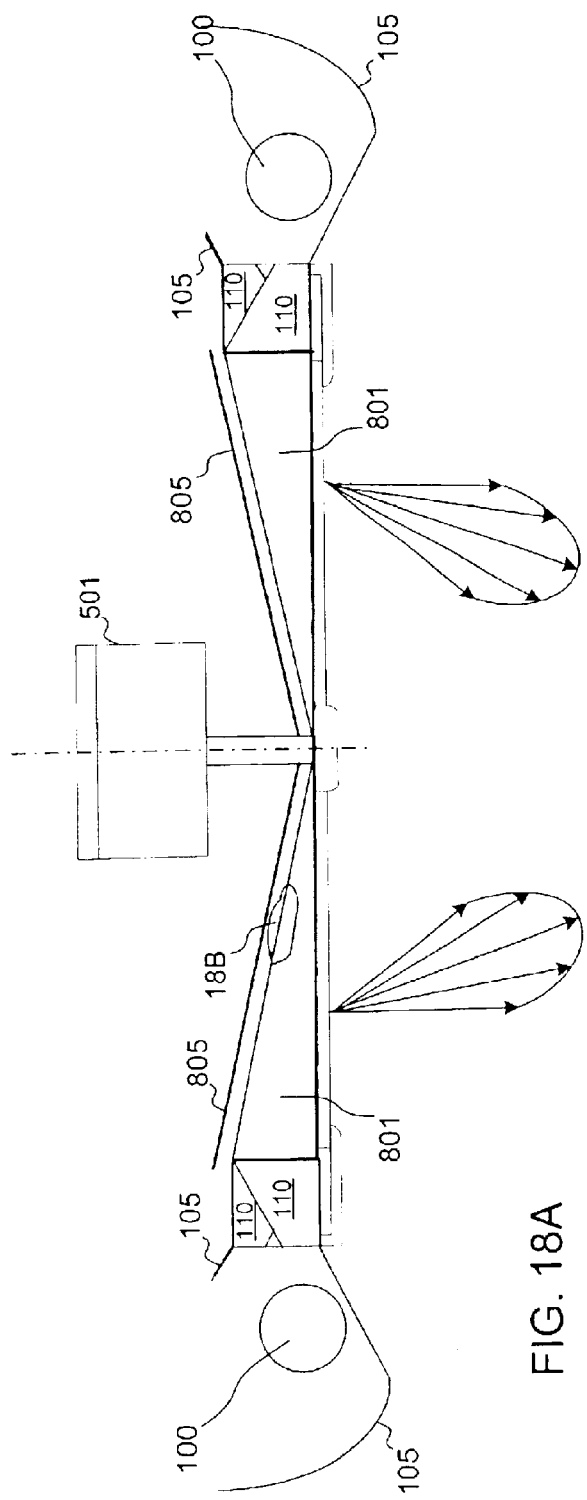
FIGS. 18A and 18B illustrate a third embodiment of the present invention.
Figure 18B:
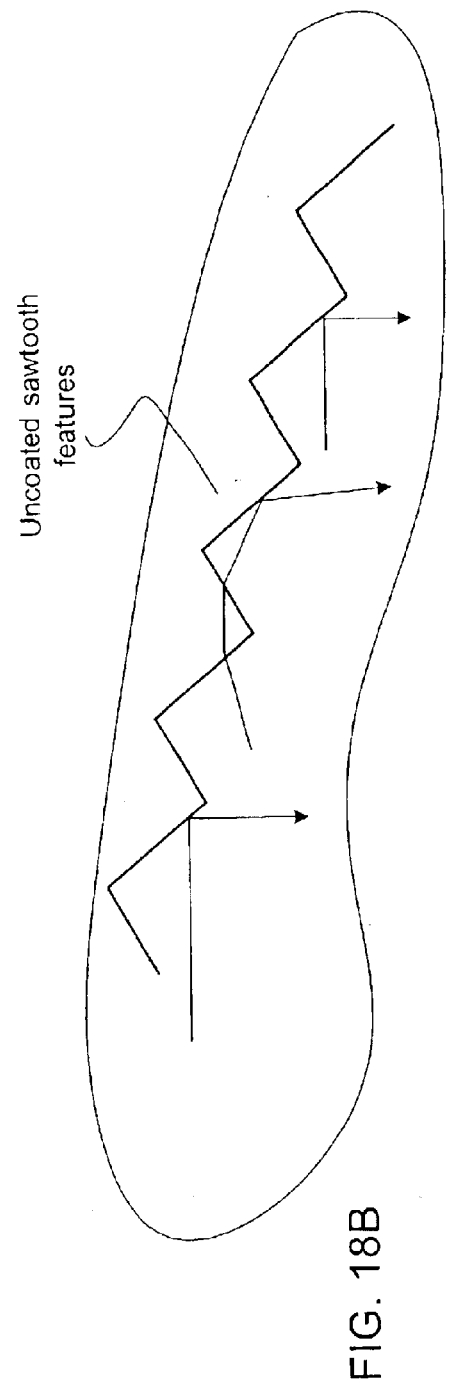

A third embodiment of the present invention, depicted in FIG. 18A, is a luminaire that includes lamps 100, curved reflectors 105, collimators 110 and a single solid waveguide 801 associated With each collimator and lamp combination that preferably has a sawtooth pattern on an angled side thereof, as shown in FIG. 18B. The sawtooth pattern is used in the same manner as the serially-arranged TIR components already described in the sense that a portion of the light that enters solid waveguide 801 totally internally reflects at each facet thereof. Leakage through a given facet is picked-up by successive facets. Remaining leakage is redirected back through the facets as desired using a specular reflector 805.

Advantages of the light guides shown in FIG. 18A include the ability to distribute light over a large exit area, and to maintain a thin cross sectional appearance for enhanced aesthetic appeal.

Fourth Embodiment

Figure 19:
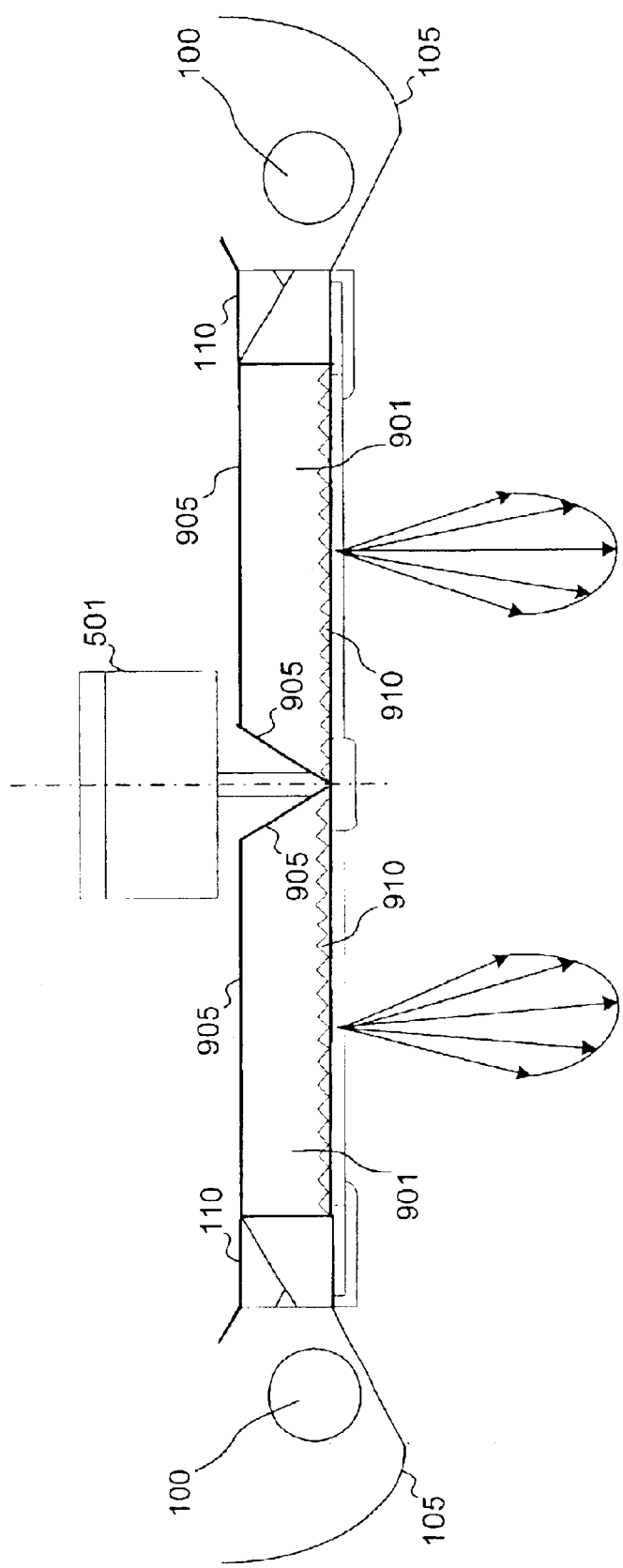
FIG. 19 shows a fourth embodiment of the present invention.

The fourth embodiment of the present invention is directed to a luminaire that comprises a hollow cavity. FIG. 19 illustrates a luminaire that includes lamps 100, curved reflectors 105, collimators 10 and a hollow cavity 901. At top and side portions of hollow cavity 901 are reflectors 905 that redirect light towards extraction features. As shown in FIG. 19, the extraction feature is preferably an uncoated sawtooth film 910. An apical angle of the sawtooth can vary along the length of the waveguide. In variants not shown in FIG. 19, reflectors 905 include microstructures features and TIR structures can be interspersed with the sawtooth film to guide more light further down the waveguide.

Some differences between the previous embodiments and this fourth embodiment include:

Hollow cavity waveguide vs. solid waveguide;

Prismatic film on the bottom of an un-tapered waveguide (as opposed to sawtooth features on the top surface of a tapered solid waveguide);

Varying the sawtooth angles along the length of the prismatic film;

Interspersing TIR features with the sawtooth features; and
Including microstructure features on the top and end reflectors.

Fifth Embodiment

Figure 20:
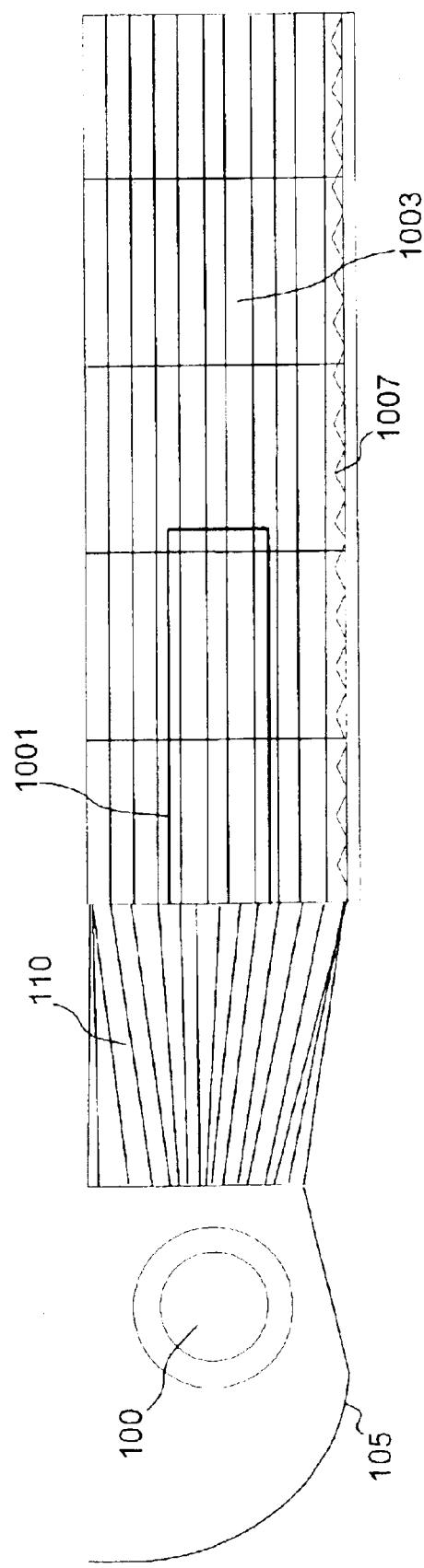
FIG. 20 shows a fifth embodiment of the present invention.

A fifth embodiment of the present invention is directed to improving the efficiency of a hollow cavity luminaire like that of the fourth embodiment. In this embodiment, depicted in FIG. 20, a refractive slab 1001 is inserted into a hollow waveguide cavity to "push" light flux further down the guide prior to extraction. Slab 1001 is preferably comprised of acrylic, but may be manufactured from any refractive material having high optical clarity and which can be molded, mechanically ground and polished, or diamond turned to provide the desired dimensions and surface smoothness. This embodiment provides superior luminance uniformity over the full length of the waveguide.

More specifically, moving more light down the waveguide (i.e., hollow cavity 1003) through slab 1001, enhances uniformity of luminance across the bottom light output surface of the waveguide. Preferably, this bottom output surface comprises a sawtooth film sheet 1007 made of, for example, polycarbonate material. The enhanced uniformity, along with the sawtooth film, adds aesthetic value and reduces glare from illuminated objects. In some applications it may be desirable to add a plurality of slabs of different lengths and thicknesses, thereby providing significant performance improvement while minimizing the volume of slab material required. Of course, it is recognized that minimizing slab material volume is important for reducing cost.

It should be recognized that individual features described with respect to specific embodiments may be combined with other embodiments to achieve alternate configurations.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A modular luminaire component, comprising:

a collimator; and a cusped reflector having an opening through which the collimator passes, the collimator being surrounded by the cusped reflector, a first portion of a cusp of the cusped reflector being disposed on one side of the collimator and a second portion of the cusp of the cusped reflector being disposed on another side of the collimator, wherein an input end of the collimator and the first and second portions of the cusp are in substantial alignment with each other.

2. The luminaire component of claim 1, wherein the cusped reflector is multi-faceted.

3. The luminaire component of claim 1, having an overall efficiency of at least 95%.

4. The luminaire component of claim 1, wherein a plurality of components are arranged in a straight line.

5. The luminaire component of claim 1, wherein a plurality of components are arranged in the shape of a circle.

6. A luminaire section, comprising:

a hollow collimator; and a cusped reflector, the cusped reflector having a centrally-located cusp from which opposing curved reflecting surfaces extend, the cusped reflector further having an opening that is sufficiently large to allow at least a portion of the hollow collimator to pass therethrough, the opening being positioned symmetrically about the cusp of the cusped reflector, the cusp of the cusped reflector being located exterior to the hollow collimator.

7. The luminaire section of claim 6, wherein the cusped reflector is multi-faceted.

8. The luminaire section of claim 6, having an overall efficiency of at least 95%.

9. The luminaire section of claim 6, wherein a plurality of sections are arranged in a straight line.

10. The luminaire section of claim 6, wherein a plurality of sections are arranged in the shape of a circle.

* * * * *